United States Patent [19]

Matsche et al.

[11] Patent Number: 5,447,633

[45] Date of Patent: Sep. 5, 1995

[54] ACTIVATED SLUDGE PROCESS FOR SEWAGE PURIFICATION

[75] Inventors: Norbert Matsche, Modling; Liang Guan, Vienna, both of Austria

[73] Assignee: Austrian Energy & Environment SGP/Waagner Biro GmbH, Vienna, Austria

[21] Appl. No.: 190,138

[22] PCT Filed: Aug. 5, 1992

[86] PCT No.: PCT/AT02/00106

§ 371 Date: Feb. 3, 1994

§ 102(e) Date: Feb. 3, 1994

[87] PCT Pub. No.: WO93/02972

PCT Pub. Date: Feb. 18, 1993

[30] Foreign Application Priority Data

Aug. 6, 1991 [AT] Austria ............... A 1560/91

[51] Int. Cl.6 ................................. C02F 3/30
[52] U.S. Cl. ..................... 210/605; 210/624; 210/626; 210/903
[58] Field of Search ............. 210/605, 623, 624, 626, 210/630, 903, 906

[56] References Cited

U.S. PATENT DOCUMENTS

| | | | |
|---|---|---|---|
| 3,957,632 | 5/1976 | Knopp et al. | 210/903 |
| 3,964,998 | 6/1976 | Barnard | 210/605 |
| 4,173,531 | 11/1979 | Matsch et al. | 210/624 |
| 4,183,809 | 1/1980 | Klopwijk et al. | 210/605 |
| 4,460,470 | 7/1984 | Reimann | 210/605 |
| 4,552,663 | 11/1985 | Spector et al. | 210/605 |
| 4,780,208 | 10/1988 | Böhnke et al. | 210/630 |
| 5,252,214 | 10/1993 | Lorenz et al. | 210/605 |

FOREIGN PATENT DOCUMENTS

| | | |
|---|---|---|
| 0014394 | 8/1980 | European Pat. Off. . |
| 2160799 | 7/1973 | France . |
| 2456712 | 12/1980 | France . |
| 2918950 | 11/1980 | Germany . |
| 3833185 | 4/1990 | Germany . |

*Primary Examiner*—Christopher Upton
*Attorney, Agent, or Firm*—Steinberg, Raskin & Davidson

[57] ABSTRACT

In a two-stage activation plant, part of the activated sludge (sludge circuit (1)) from the first stage (11) is transferred to the second stage (12) and part of the activated sludge (sludge circuit (2)) from the second stage (12) is transferred to the first stage (11), so that mixed biocenoses are formed in both stages (11 and 12). The biomass to be denitrified from the first stage is transferred to the second stage by the sludge circuit (1) and the biomass to be nitrified from the second stage is transferred to the first stage by the sludge circuit (2), so that not only carbon compounds are decomposed but nitrogen compounds may be removed by nitrification and denitrification in both stages (11 and 12).

21 Claims, 1 Drawing Sheet

ACTIVATED SLUDGE PROCESS FOR SEWAGE PURIFICATION

BACKGROUND OF THE INVENTION

The invention relates to an activated sludge process for sewage purification in which the sewage is introduced into a first, partially aerated activation stage, is then submitted to intermediate clarification, is then introduced into a second, partially aerated activation stage, is subjected to post-clarification and is then removed, in which sludge is fed back from the intermediate clarification into the first activation stage and from the post-clarification into the second activation stage, and in which excess sludge is removed from at least one activation stage is removed from the sludge circuit.

The usual two-stage activated sludge process (Doctor W. Lindner, "The Two-Stage Activation Process in Sewage Purification" (Kempten 1957), Thomas-Verlag) is a known process. In this process, substrate breathing where the micro-organisms consume oxygen through the oxidation of organic compounds and where the biological decomposition of carbon compounds is therefore most conspicuous takes full effect in the first activation stage with high sludge load. The second activation stage in this known process is generally carried out with lower sludge load so that a decomposition of the remaining carbon compounds and the oxidation of nitrate compounds (nitrification) takes place.

Normally the known, two-stage activation process is carried out with a sludge proportion of 0.8 to 2.0 kg $BO_5$(biochemical oxygen requirement in 5 days)/kg dry substances and per day in the first stage and from 0.15 to 0.5 kg $BOR_5$/kg dry substance and per day in the second activation stage (Lehr- und Handbuch der Abwassertechnik [Instructions and Handbook for Sewage Technology], published by the Abwassertechnischen Vereinigung (Sewage Technology Association) e.V. in St. Augustin, Berlin Ernst Verlag, page 426, vol. IV, 3rd edition, 1985). In the method which is typical for this process, the major part of carbon decomposition takes place as described in the first stage, and extensive nitrification in the second stage. Denitrification is no longer possible in the second stage due to the absence of easily decomposed carbon substrate. The withdrawal of excess sludge from the overall plant takes place either during pre-clarification before the first stage or, in the absence of preclarification, from the sludge circuit of the first stage The excess sludge of the second stage is withdrawn together with the sludge of the first stage without giving rise to a controlled removal of nitrogen because no anoxic conditions exist in the first stage.

In a process known from AT-PS 318.503 for the elimination of organically and inorganically attached nitrogen from domestic and industrial sewage, nitrified sewage is taken from the sedimentation basin of the second process stage and is fed into a conduit through which sewage is conveyed from the aeration basin of the first stage into the post-clarification basin of the first stage for the denitrification of the ammonium nitrified in the second process stage, and thereby for the elimination of nitric nitrogen from the sewage to be purified. In the process known from AT-PS 318.503 only denitrification takes place in the first process stage (aeration basin and sedimentation basin) and only nitrification takes place in the second process stage.

In the process known from DE-OS 31 36 409, two plants, i.e. two stages of equal rank are parallel-connected for nitrification. According to the DE-OS 31 36 409 particularly favorable conditions for the nitrification are to be maintained in the auxiliary nitrification stage so that no interruption of nitrification may occur in case of disturbances in the main nitrification stage but that biology held in reserve in the auxiliary nitrification stage may be introduced from same into the main stage if necessary to ensure that nitrification can be continued therein substantially without interruption once a disturbance has occurred.

WO 83/00856 describes a sludge treatment process in which only carbon compounds are to be decomposed and in which neither nitrification nor denitirification takes place. In this process treated sludge coming from a pre-thickener is fed to an aerobic treatment stage for aerobic treatment. The discharge from the aerobic treatment stage is conveyed to an anaerobic treatment stage for a digestion process in which additional decomposition processes occur. Part of the substrate is fed back from the anaerobic treatment stage into the aerobic treatment stage according to WO 83/00856. No mixed biocenoses are produced thereby, since the bacteria which are active in the aerobic treatment stage are not viable in the anaerobic treatment stage and vice versa.

A process known under by the name "AB Process" from DE-PS 26-40-875 is a two-stage sewage purification process in which the first stage, an adsorption stage, is heavily charged (sludge proportion 2.0 to 10.0 kg $BOR_5$/kg dry substance and per day) and serves for the decomposition or adsorption of carbon compounds. The second stage operates with a sludge proportion of 0.15 to 0.30 kg $BOR_5$/kg dry substance and per day and serves for nitrification. Denitrification is possible only in the second stage in this process, and then only in function of the integration of carbon compounds not eliminated in the first stage, and this is difficult to control in operation. In the process known from DE-PS 25 40 875 the biocenoses of the first and second stage must be kept strictly separate from each other in order to provide the advantage of removal of carbon compounds in the first stage with little energy consumption and with adsorption.

The purification of sewage through nitrification and denitrification in activation plants can in carried out in principle in single-stage and in two stage plants. In order to achieve certain nitrification it is necessary to respect a given sludge age in the plant in function of temperature of the sewage so that the slowly growing nitrifying bacteria in the activated sludge may indeed be present and are not washed out. The age of the sludge in an activation plant is however decisively influenced by the proportion of carbon compounds in the sewage since the nitrifying bacteria represent only a small part of the entire biomass (less than 5%).

Due to these conditions the size of the single-stage activation plant for sewage purification through nitrification is mainly determined by the proportion of decomposable carbon compounds.

In two-stage processes a good basis for nitrification in the second stage can be created through the extensive decomposition of the carbon compounds in the first stage without nitrification and the subsequent treatment of the pre-purified sewage in the second stage because it is possible to operate with comparatively small basin volumes after removal of the carbon compounds of old-age sludge.

For the removal of nitrogen compounds from the sewage the reduction of nitrate into gaseous nitrogen (denitrification) taking place in the absence of dissolved, i.e. free oxygen and with the utilization of the oxygen attached to the nitrate (anoxic conditions) is however advantageous after the oxidation of nitrogen compounds ($NH_4+$) reduced to nitrate. In single-stage plants this can be achieved with appropriate configuration of the basin and adaptation of the oxygen arrival, so that aerobic and anoxic conditions are created. The inclusion of denitrification in the process requires however additional enlargement of the required basin volume.

The inclusion of denitrification in two-stage installation is basically possible, but because of the spatial separation between the decomposition of the carbon compounds in the first stage and the nitrification in the second stage, the supply of carbon compounds required for the reduction of the produced nitrate during denitrification is now very low. Effective denitrification in conventional two-stage processes is possible only through recirculation of nitrified, essentially sludge-free discharge from the post-clarification in the fist stage and the establishment of anoxic conditions in same (see also Wilhelm v.d. Emde "Betriebsweise von Belebungsanlagen" [Operation of activation plants] in Wiener Mitteilungen Wasser - Abwasser - Gewässer, Vol. 81, Vienna 1990, second edition).

The denitrification in the two-stage AB process (DE-PS 26 40 875) can only be achieved through limitation of the carbon removal in the first high-load stage, e.g. by reducing air supply, and thereby by shifting the carbon removal into the second stage, also while maintaining anoxic conditions. Recirculation before completion of the second stage into the first stage which is a highest-load stage would serve little purpose because of the short sojourn time. On the other hand however, the advantage with respect to maintaining optimal conditions in nitrification is lost because of the limitation of carbon removal in the first stage.

To sum up it can therefore be said for the operation methods used at this time in activation processes that in the single-stage process the production of a mixed biocenosis for carbon decomposition, nitrification and denitrification creates good conditions for the obtention of good results, but the volume requirements for activation basins for this are relatively high, e.g. 200 l/EGW (liter/population equivalence). In the two-stage processes the conditions for nitrification are generally better in the second stage because of the decomposition of the carbon compounds in the first stage. For denitrification however, considerable streams of volume must be fed back, and this leads to a heavy load for the sedimentation basin following the activation basin of the first or of the second stage. A reduction of the decomposition effect of the first stage (in the AB process) on the other hand represents a partial elimination of the advantages with respect to the nitrification in the second stage and can be achieved only at high operating costs with a reduction of the oxygen supply and the danger of odor emissions.

OBJECT AND SUMMARY OF THE INVENTION

It is the object of the invention to propose a process of the type mentioned initially in which the advantages of the single-stage and of the two-stage processes are combined.

According to the invention this object is attained in a process of the type mentioned initially in that at least part of the activated sludge constituted in the first activation stage, in particular the excess sludge, is transferred into the second activation stage and at least part of the activated sludge constituted in the second activation stage, in particular the excess sludge is transferred into the first activation stage and in that in addition to the decomposition of carbon compounds, a decomposition of nitrogen compounds is carried out through nitrification and denitrification in the first activation stage as well as in the second activation stage. Advantageous and preferred variants of the process are indicated in the sub-claims. In the invention, controlled mixing of the biocenoses in a two-stage plant makes it possible to avoid the disadvantage of difficulties in denitrification which results from the separation of the biocenoses carried out in the second stage for the purpose of carbon decomposition in the first stage and nitrification in the second stage. The controlled transfer of activated sludge from the first stage, with high oxygen consumption, into the second stage makes it possible to bring denitrifying biomass into the second stage. This controlled transfer of biomass from the first stage into the second stage results in a mixing with the nitrifying biomass of the second stage, so that it becomes possible in this second stage, by means of a controlled formation of a mixed biocenosis, to achieve denitrification in addition to nitrification. It is advantageous in this case for the transfer of biomass from the first into the second stage to be controlled in such manner that the age of the sludge required for extensive nitrification can be respected.

By contrast to the method of operation in a single-stage plant where the denitrification is produced by the pollution present in the sewage (the extent of pollution is reflected substantially by the $BOR_5$ value of the sewage), denitrification in the process according to the invention is achieved in that the denitrifying biomass from the first stage is transferred in form of an activated bio-sludge into the second stage and there, together with the nitrifying biomass of the second stage, constitutes a mixed biocenosis which is capable of nitrification as well as of denitrification. The carbon compounds absorbed in the first stage due to the biomass are brought into the second stage through the transfer of the activated sludge. They are used therein as an additional carbon source for denitrification in the second stage. The ratio between nitrification and denitrification capability of the formed mixed biocenoses depends in the invention on the quantity of sludge transferred from the first stage into the second stage. Since only small volumes are involved in the transfer of sludge from one stage into another stage by comparison to the quantity of sewage (ratio approx. 1:20), no additional hydraulic load is imposed upon the plant.

When the nitrification is reduced it is possible, in the process according to the invention, to achieve an improvement very quickly by reducing the volume of denitrification biomass coming from the first stage. Depending to the degree to which the two biocenoses are mixed, the conditions of a single-stage plant (with extensive transfer of the sludge from the first into the second stage) and conditions of a two-stage plant (with interruption of sludge transfer) can be established in a plant with mixed biocenoses.

Similarly a mixing of the biocenosis of the second stage with that of the first stage takes place since activated sludge (e.g. excess sludge) is transferred from the second stage into the first stage. Thanks to this measure nitrifying bacteria are transferred from the second stage into the first stage where they cannot be held automatically because of the prevailing conditions (the actual age of the sludge is not sufficient for stable colonization by nitrifying bacteria in the first stage). Because of the constant arrival of nitrifying bacteria in the first stage these are however present in the mixed biocenosis of the first stage to the extent that activated sludge of the second stage is fed back. Because of the high concentration of ammonia nitrogen prevailing in this stage the growth rates of the nitrifying bacteria are however not restricted and can operated at nearly maximum speed. By contrast, a lowering of the growth rates always occurs in the second stage because of the desired low concentration of ammonia nitrogen in said second stage based on the Monod relationship: $V = V_{max} \cdot S/(K_s + S)$ where $V$ = the current turnover (growth) rate, $V_{max}$ = maximum turnover (growth) rate, $S$ = substrate concentration and $K$ = substrate concentration with growth rate at half of maximum.

Due to this fact it is possible to nitrify in the aerobic portion of the first stage simultaneously with the decomposition of the carbon compounds, whereby the formed nitrate is denitrified very rapidly because of the high breathing activity of the activated sludge in this stage in the anoxic ranges. In this manner, through the controlled mixing of the biocenoses of the second and of the first stage, the aerating capacity exiting in the first stage is also used optimally to remove nitrogen compounds through nitrification and denitrification in addition to the removal of carbon compounds, with the extent of growth depending on the composition of the mixed biocenoses. Here too, the variation of a purely two-stage operation suffices as back-feeding of biomass from the second into the first stage is interrupted until a nearly single-stage operation is obtained in case of complete sludge circuits.

In the process according to the invention, activated sludge can be taken out directly from the basin in which the respective activation stage (first or second) is being carried out. It is furthermore possible to take activated sludge from the first or second activation stage and to transfer it to the other activation stage. Finally, activated sludge can be taken from the intermediate clarification basin downstream of the first activation stage and be transferred into the second activation stage. Activated sludge can logically be taken from the post-clarification basin downstream of the second activation stage and be transferred to the first activation stage.

Overall the process according to the invention is as follows, and can be carried out for instance in plants such as shown as schematic examples in FIGS. 1 and 2.

DETAILED DESCRIPTION OF THE INVENTION

Figure 1:
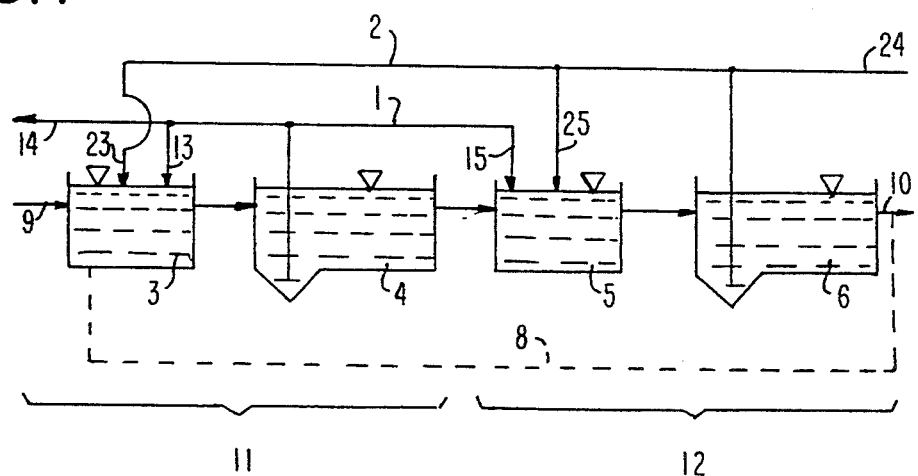
FIG. 1 shows a two-stage activation process with mixed biocenosis for nitrification and denitrification and FIG. 2 shows a variant of the process with biological removal of phosphor.

This is a two-stage activated sludge process (stages 11 and 12) for the purification of sewage in which sewage 9, introduced into the first activation basin 3 having at least one aerated and at least one non-aerated zone and being set up and operated with a sludge age of at least 1 to 5 days, is then subjected to intermediate clarification in an intermediate clarification basin 4, and is thereupon introduced into a second activation stage 5 with at least one aerated and at least one non-aerated zone, set up and operated with a sludge age of 3 to 15 days, is then subjected to post-clarification in a post clarification basin 6 and is then removed, whereby sludge is withdrawn from the intermediate clarification in a first sludge circuit 1, is fed back in part in form of feed-back sludge 13 into the first activation stage and is in part introduced as an active biomass into the second activation stage (sludge circuit 1) and in part withdrawn from the first sludge circuit in form of excess sludge 14. From the post-clarification in the post-clarification basin 6 of the second stage 12, the sludge is withdrawn in a second sludge circuit 2, is fed back in part in form of feed-back sludge 25 into the second activation basin 5, is in part fed back as active biomass 23 into the first stage 11 and is in part withdrawn as excess sludge 24 from the sludge circuit 2.

Thereby nitrification and denitrification takes place in the first stage 11 as well as in the second stage 12, respectively comprising at least one activation basin and at least one sedimentation basin. The biomass constituted in the second stage 12 is introduced into the first stage 11 and the first stage is thereby inoculated with nitrifiers. Thus nitrification, normally impossible with an aerobic sludge age of e.g. two days at a sewage temperature of 10° C., also takes place in the first stage.

Ammonium nitrogen, as a rule in a concentration of over 10 mg/l, is contained in the first stage 11, and for this reason nitrifiers grow at nearly maximum speed. At the same time a sufficient amount of easily decomposed carbon compounds and highly active heterotrophic bacteria is present here too, and therefore the nitrified nitrogen can be denitrified in the same stage. At the same time over 75% of the carbon compounds are removed from the sewage in the first stage 11. Part of the biomass 15 constituted in the first stage is introduced into the second stage via sludge circuit 1. Organic hydrocarbon compounds are adsorbed extensively on this biomass. The heterotrophic bacteria composing the major part of this biomass use nitrate as the electron acceptor and organic compounds as electron donors in the anoxic zones of the second stage 12. As a result denitrification becomes possible, this being normally impossible in a conventional two-stage activation plant because of the lack of carbon compounds and active heterotrophic bacteria.

Sufficient aerobic sludge age is a pre-condition for certain nitrification in an active sludge system. The nitrification in the second stage 12 is barely affected by organic compounds because as a rule more than 75% of the carbon compounds are already removed in the first stage 11. Possible fluctuations in nitrogen content in the arriving sewage are compensated for in the first stage 11, with approximately 50% of the nitrogen being removed as a rule in this stage. For this reason an aerobic sludge age of 10 days and a sewage temperature of 10° C. is sufficient for the second stage 12 in order to keep the ammonium nitrogen lower than 2 mg/l in the discharge.

Figure 2:
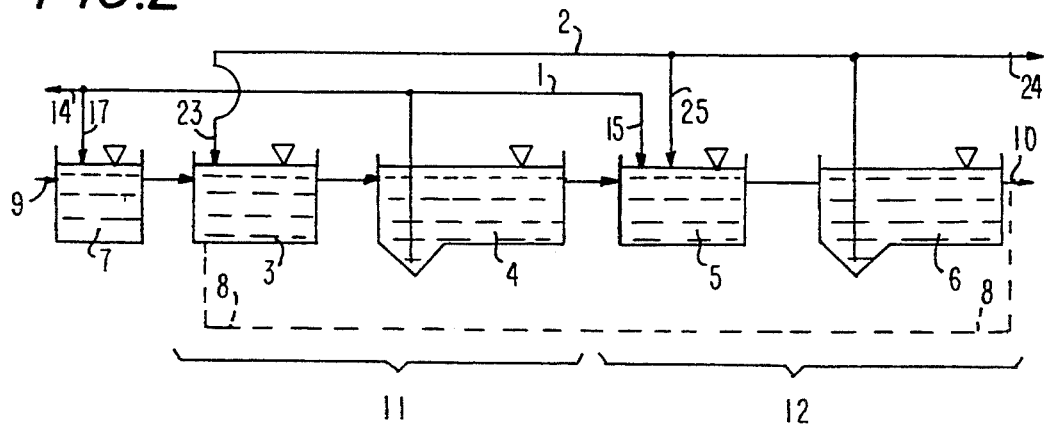

Three basic conditions must be met for biological phosphor elimination which can be carried out according to FIG. 2 in a plant in combination with the process according to the invention: Anaerobic and aerobic conditions in the sludge circuit, volatile fatty acid and a suitable sludge age. In the first stage of this process easily decomposed, volatile fatty acids are as a rule present in sufficient quantity. In an additionally constituted anaerobic basin 7, the polyphosphate-accumulating bacteria are able to use the energy stored in the polyphosphate to maintain their metabolism by decomposing the easily decomposed volatile fatty acids and by releasing phosphate into the solution. In the aerobic zone the bacteria again store decomposed polyphosphate in the cell, with phosphate being accepted in greater quantity from the solution. In order to keep phosphate at less than 1 mg/l in the discharge, a chemical precipitation can be used by adding a dosage of the precipitant in the first stage and/or in the second stage.

To increase the overall capacity in nitrogen removal according to the invention, part of the nitrate can be denitrified in the first activation basin 3 through the introduction of part of the discharge of the post clarification 4 back into the anoxic zone of the first stage (see conduit in FIGS. 1 and 2 indicated by broken lines).

The process according to the invention may have the following characteristics:

Operation of a two-stage activation plant with transfer of part of the sludge (excess sludge) constituted in the first stage 11 into the second stage 12 (sludge circuit 1,15) and transfer of part of the sludge (excess sludge) constituted in the second stage 12 into the first stage 11 (sludge circuit 2,23) so that mixed biocenoses are formed in both stages and denitrifying biomass is on the one hand transferred through sludge circuit 1 into the second stage and on the other hand nitrifying biomass is transferred through the sludge circuit 2 into the first stage whereby nitrogen compounds can be removed through nitrification and denitrification in the fist stage as well as in the second stage, in addition to the decomposition of carbon compounds.

The desired sludge age in the first stage 11 is two days at a sewage temperature of 10° C. and with a basin share of 50% and can be varied between 1 and 5 days depending on the aerobic contents of the activation basin 3 and the temperature of the sewage.

The sludge loads in the first stage 11 resulting from this are typically 0.4 kg $BOR_5$/kg dry substance and per day with a range of fluctuation from 0.2 to 0.8, so that a spacial load of 2 kg $BOR_5/m^3$ and per day with a fluctuation range of 0.8–4 results with a typical sludge content of 5 g/l (range 2–10 g/l).

The desired sludge age in the second stage 12 with a sewage temperature of 10° C. and an aerobic basin share of 50% is 10 days and can also be varied between 3 and 15 days depending on the temperature and the aerobic share of the activation basin 5.

The sludge loads resulting from this in the second stage 12 are typically 0.08 kg $BOR_5$/kg dry substance and per day with a variation range of 0.03–0.15, so that with a typical sludge content of 5 g/l (range 2–10 g/l) a spacial load of 0.4 kg $BO_5/m^3$ and per day with a fluctuation range of 0.1–0.75 results.

The share of non-aerated basin volume in the overall volume of the activation basin 3,5 of the single stages 11 and 12 is typically 30 to 50%, it also being possible to operate within a range of 10 to 70% to optimize special operating condition (sewage concentration, temperature, etc.).

The sludge circuit 1 can also be implemented in whole or in part through the suspended particles which are present in the discharge of the first stage with suitably heavy loading of the intermediate clarification basin 4.

The sludge circuit 2 can also be completed in part through a back-feeding of discharge of discharge from the post-clarification, with nitrate present in the discharge being denitrified in the first stage.

The removal of phosphor compounds is not affected by the process according to the invention and can be achieved either through chemical precipitation, with precipitation chemicals being preferably added mostly in the first stage. However it is also possible to carry out biological removal of phosphor through the process according to the invention by providing (see FIG. 2) a non-aerated anaerobic basin 7 before the activation basin 3 of step 11 into which the arriving sludged and the feed back sludge in of the first stage is introduced. In the anaerobic section phosphate is dissolved back and in the subsequent aerobic section an increased acceptance and thereby biological removal of phosphate takes place.

When increased phosphor removal is required (P less than 0.5 mg/l) a purification stage with flocculation filtration can be added.

Excess sludge is taken from the system preferably at the fist stage, and if biological P-removal is used care must be taken that no P is fed back from the sludge treatment together with cloudy water. If necessary, excess sludge can also be taken from the second stage.

If necessary the process according to the invention may also contain a mechanical pre-clarification stage in addition to raking and sand catching.

When a quantity of mixed water occurs during rain, up to a multiple of the quantity during dry weather can be processed according to the required specifications.

The invention is explained through the plant shown schematically in FIG. 1:

The process according to the invention was tested in a two-stage clarification plant. The essential technical data of the plant are indicated below:

| Activation basin 3 | 200 m$^3$ |
|---|---|
| Intermediate basin 4 | 72 m$^2$ (170 m$^3$) |
| Activation basin 5 | 330 m$^3$ |
| Post-clarification basin 6 | 194 m$^2$ (650 m$^3$) |

In addition, raking and sand catching is provided.

During the test the two activation basins 3,5 were operated so that 50% was aerated (aerobic) and the remaining 50% non-aerated (anoxic - oxygen supplied through nitrate or anaerobic). At the time of the test the plant was loaded with approximately 6000 EGW (population equivalence). With an arrival of 290 mg/l $BOR_5$ and 45 mg/l TKN (=total Kjeldahl nitrogen) as well as with a supply amount of 1250 m$^3$/d representing a volume load of 1.8 kg $BOR_5/m^3$ and per day and with a sludge content in the activation basin of 5.1 g/l representing a sludge load of 0.35 kg $BOR_5$/kg dry substance and per day the following discharge values were obtained in the first stage 11 at a temperature of 10° C. and with a sludge age of approximately 2 days in the first stage 11:

| $BOR_5$ (dissolved) | 25 mg/l |
|---|---|
| TKN | 27 mg/l |

In the activation basin 5 of the second stage 12 the sludge content amounted to 5.0 g/l and the volume load resulting from the arrival of sludge from the first stage and the discharge of the intermediate clarification amounted to approximately 0.4 kg BOR$_5$/m$^3$ and per day; the appertaining sludge load was calculated to be 0.08 kg BOR$_5$/kg dry substance and per day and the sludge age was approximately 12 days. The results obtained in the discharge 10 were:

| | |
|---|---|
| BOR$_5$ | 7 mg/l |
| TKN | 2 mg/l |
| NO$_3$–$_N$ | 6 mg/l |

Based on this, the efficiency calculated for the entire plant is over 97% for the BOR$_5$ and 82% for the nitrogen.

The sludge circuits for the obtention of mixed biocenoses in the two activation stages were adjusted in this case so that approximately 30% of the excess sludge production of the first stage was transferred into the second stage (approximately 150 kg/d) and the total excess sludge production of the second stage (approximately 140 kg/d) was transferred back into the first stage.

In the case described here, the excess sludge of the entire plant was taken only from the first stage 11. At higher sewage temperatures an greater quantity of sludge can be transferred from the sludge circuit 1 into the second stage without adverse effects on nitrification, so that nitrate value in the discharge can be lowered to nearly 0 while the efficiency of nitrogen removal can be increased to 95%.

In practical application of the process according to the invention it is possible to operate with a comparatively low specific activation basin volume of approximately 90 l/EGW (liter/population equivalence) for the purification of communal sewage. A typical value for single-stage activation plants functioning according to the state of the art and with comparable purification capacity (total nitrogen removal over 80 %) is approximately 200 l/EGW (liter/population equivalence). This considerable elimination of nitrogen is not achieved by the known two-stage processes.

Another advantage of the process according to the invention is the fact that as existing plants for nitrogen removal are being expanded, the existing basins can be incorporated extensively into the new process, and the existing activation stage can be used as first or as second stage, depending on basin volume and sewage conditions.

We claim:

1. Activated sludge process for the purification of sewage, comprising the steps of:
    introducing the sewage into a first activation stage having at least one aerated zone and at least one non-aerated zone,
    subjecting the sewage after the first activation stage to intermediate clarification, and
    introducing the sewage into a second activation stage after the intermediate clarification, said second activation stage having at least one aerated zone and at least one non-aerated zone,
    subjecting the sewage after the second activation stage to post-clarification and then removing the sewage,
    feeding sludge from the intermediate clarification into the first activation stage,
    feeding sludge from the post-clarification into the second activation stage, and
    removing excess sludge from at least one of said first and second activation stages from the sludge circuit,
    transferring a portion of sludge formed in the first activation stage into the second activation stage, and
    transferring a portion of sludge formed in the second activation stage into the first activation stage such that in the first and second activation stages, nitrogen compounds are decomposed through nitrification and denitrification in addition to the decomposition of carbon compounds.

2. Process as in claim 1, further comprising the step of operating the first activation stage with a sludge age of 1 to 5 days.

3. Process as in claim 2, further comprising the step of operating the first activation stage at a sewage temperature of 10° C. and with 50% of the aerobic basin content having a sludge age of 2 days.

4. Process as in claim 1, further comprising the step of operating the first activation stage with a sludge load of 0.2 to 0.8 BOR$_5$/kg dry substance and per day.

5. Process as in claim 1, further comprising the step of operating the first activation stage with a sludge content of 2 to 10 g/l and a spacial load of 0.8 to 4 kg BOR$_5$/m$^3$ and per day.

6. Process as claim 1, further comprising the step of operating the second activation stage with a sludge age of 3 to 15 days.

7. Process as in claim 6, further comprising the step of operating the second activation stage at a sewage temperature of 10° C. and with 50% of aerobic basin content at a sludge age of 10 days.

8. Process as in claim 1, further comprising the step of operating the second activation stage with a sludge load of 0.03 to 0.15 kg BOR$_5$/m$^3$ dry substance and per day.

9. Process as in claim 1, further comprising the step of operating the second activation stage with a sludge content of 2 to 10 g/l g/l and with a spacial load of 0.1 to 0.75 kg BOR$_5$/m$^3$ and per day.

10. Process as in claim 1, further comprising the step of operating the different activation stages with a share of 10% to 70% non-aerated basin volume of the total volume of the activation basins.

11. Process as in claim 1, further comprising the step of removing sludge from the activation basin in which the first activation stage is carried out.

12. Process as in claim 1, further comprising the step of removing sludge from the activation basin in which the second activation stage is carried out.

13. Process as in claim 1, further comprising the step of feeding discharge emerging from the post-clarification following the second activation stage into the first activation stage.

14. Process as in claim 13, wherein the discharge representing 30 to 50% of the arriving sewage is fed back into the first activation stage.

15. Process as in claim 1, further comprising the step of simultaneously transferring activated sludge of the first activation stage into the second activation stage and transferring activated sludge of the second activation stage into the first activation stage.

16. Process as in claim 1, further comprising the step of operating the first activation stage with a sludge load of 0.4 kg BOR$_5$/kg dry substance and per day.

17. Process as in claim 1, further comprising the step of operating the first activation stage with a sludge content of 5 g/l and a spacial load of 2 kg $BOR_5/m^3$ and per day.

18. Process as in claim 1, further comprising the step of operating the second activation stage with a sludge load of 0.08 kg $BOR_5/m^3$ dry substance and per day.

19. Process as in claim 1, further comprising the step of operating the second activation stage with a sludge content of 5 g/l and with a spacial load of 0.4 kg $BOR_5/m^3$ and per day.

20. Process as in claim 1, further comprising the step of operating the different activation stages with a share of 30% to 50% non-aerated basin volume of the total volume of the activation basins.

21. Activated sludge process for the purification of sewage, comprising the steps of:

introducing sewage into a first activation stage having at least one aerated zone and at least one non-aerated zone, passing the sewage from the first activation stage into an intermediate clarification basin;

passing the sewage from the intermediate clarification basin into a second activation stage having at least one aerated zone and at least one non-aerated zone, passing the sewage from the second activation stage to a post-clarification basin, removing the sewage from the post-clarification basin, and recycling sludge from each of said intermediate clarification basin and post clarification basin to both of said first and second activation stages to cause decomposition of nitrogen compounds through nitrification and denitrification in addition to the decomposition of carbon compounds in the first and second activation stages.

* * * * *